US009446797B2

(12) United States Patent
Nakauchi et al.

(10) Patent No.: US 9,446,797 B2
(45) Date of Patent: Sep. 20, 2016

(54) FRONT VEHICLE-BODY STRUCTURE OF VEHICLE

(71) Applicant: MAZDA MOTOR CORPORATION, Hiroshima (JP)

(72) Inventors: Shigeru Nakauchi, Hiroshima (JP); Nobuyuki Nakayama, Aki-gun (JP); Masahide Kanemori, Aki-gun (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 14/790,512

(22) Filed: Jul. 2, 2015

(65) Prior Publication Data
US 2016/0031485 A1    Feb. 4, 2016

(30) Foreign Application Priority Data

Aug. 1, 2014  (JP) .................... 2014-157265

(51) Int. Cl.
*B60J 7/00*  (2006.01)
*B62D 25/08*  (2006.01)
*B62D 25/14*  (2006.01)

(52) U.S. Cl.
CPC .......... *B62D 25/088* (2013.01); *B62D 25/081* (2013.01); *B62D 25/082* (2013.01); *B62D 25/085* (2013.01); *B62D 25/145* (2013.01)

(58) Field of Classification Search
CPC .............. B60G 17/04; B60R 13/0206; B60R 13/0212; B60R 2013/0281; B60R 2013/0293
USPC ........ 296/203.02, 187, 192, 193.09; 280/781
See application file for complete search history.

(56) References Cited

U.S. PATENT DOCUMENTS

| 4,372,575 | A  | * | 2/1983  | Hyma   | B60G 13/003 267/221 |
|-----------|----|---|---------|--------|---------------------|
| 4,958,849 | A  | * | 9/1990  | Pinch  | B60G 15/068 248/632 |
| 6,241,266 | B1 | * | 6/2001  | Smith  | B60B 35/04 280/124.116 |
| 6,257,601 | B1 | * | 7/2001  | Spears | B60G 13/003 280/124.147 |
| 6,773,057 | B2 | * | 8/2004  | Nomura | B62D 25/088 280/788 |
| 7,140,674 | B2 | * | 11/2006 | Miyoshi| B62D 25/082 296/193.05 |
| 7,404,596 | B2 | * | 7/2008  | Miyata | B62D 25/088 296/203.02 |
| 7,703,805 | B2 | * | 4/2010  | Sasaki | B62D 21/152 280/784 |

(Continued)

FOREIGN PATENT DOCUMENTS

JP   H08-164874 A    6/1996

*Primary Examiner* — Kiran B Patel
(74) *Attorney, Agent, or Firm* — Studebaker & Brackett PC

(57) ABSTRACT

There are provided a cowl panel provided above a dash panel partitioning an engine room from a vehicle compartment and extending in a vehicle width direction, a suspension tower protruding toward an inside of the engine room and supporting a front suspension, and a connecting bracket connecting the suspension tower and the cowl panel and configured to slant rearward and upward, wherein the connecting bracket comprises a front-end flange portion and a rear-end flange portion, the front-end flange portion is joined to a slant portion formed at a rear portion of a top of the suspension tower which is configured to slant rearward and downward, and the rear-end flange portion is configured to rise upward via a bending portion and joined to a vertical wall portion of the cowl panel.

6 Claims, 3 Drawing Sheets

(56) References Cited

U.S. PATENT DOCUMENTS

| | | | | |
|---|---|---|---|---|
| 7,845,716 B2* | 12/2010 | Kiyotake | ............ | B62D 21/152 296/203.02 |
| 7,854,473 B2* | 12/2010 | Kuroita | ............... | B62D 25/081 296/192 |
| 8,201,873 B2* | 6/2012 | Nishimura | ............ | B62D 25/04 296/193.06 |
| 8,419,116 B2* | 4/2013 | Boettcher | ............... | B60R 19/24 293/133 |
| 8,696,049 B2* | 4/2014 | Hagino | ................... | B60H 1/28 296/192 |
| 8,777,300 B2* | 7/2014 | Kim | ..................... | B62D 25/088 296/192 |
| 9,033,400 B2* | 5/2015 | Sasaki | .................. | B62D 25/08 296/187.09 |
| 9,096,274 B2* | 8/2015 | Kaneko | .................. | B62D 25/14 |
| 9,126,634 B2* | 9/2015 | Sasaki | .................. | B62D 25/088 |
| 9,248,865 B2* | 2/2016 | Hisazumi | ............. | B62D 25/082 |
| 9,266,567 B1* | 2/2016 | Young | .................... | B62D 24/04 |
| 9,321,488 B2* | 4/2016 | Kawachi | ................ | B62D 25/04 |
| 2005/0067858 A1* | 3/2005 | Suh | ....................... | B62D 25/088 296/192 |
| 2009/0146455 A1* | 6/2009 | Honji | ................... | B62D 21/152 296/187.09 |
| 2009/0243336 A1* | 10/2009 | Honji | .................. | B62D 21/152 296/187.09 |
| 2011/0272970 A1* | 11/2011 | Usuda | .................... | B62D 25/14 296/193.09 |
| 2012/0205944 A1* | 8/2012 | Kido | ..................... | B62D 25/088 296/187.09 |
| 2016/0031484 A1* | 2/2016 | Nakauchi | ................ | B60R 19/24 296/187.09 |

\* cited by examiner

FRONT VEHICLE-BODY STRUCTURE OF VEHICLE

BACKGROUND OF THE INVENTION

The present invention relates to a front vehicle-body structure of a vehicle, and in particular, relates to the front vehicle-body structure of the vehicle which comprises a connecting bracket connecting a cowl panel and a suspension tower.

Conventionally, a front vehicle-body structure of a vehicle comprising a cowl panel provided above a dash panel which partitions an engine room from a vehicle compartment and extends in a vehicle width direction and a suspension tower protruding toward an inside of the engine room and supporting a front suspension is known. Herein, there is a problem in that since a top of the suspension tower supports a damper device of a front suspension, an inclination angle of the suspension tower may be changed by a load which is generated in a vertical direction (i.e., a vertical load) during a vehicle traveling and this change of the suspension tower's inclination angle may have an influence on the maneuverability and stability of the vehicle. Accordingly, technologies to improve the rigidity of preventing the suspension tower from falling down have been proposed.

Japanese Patent Laid-Open Publication No. H8-164874 discloses a front vehicle-body structure of a vehicle in which a brace (connecting bracket) is joined to a side edge portion of an upper wall of a wheel apron in a range from an upper face of a top of a suspension tower to an upper face of a top plate of a cowl box. According to this structure, the bending rigidity and the torsional rigidity of the wheel apron can be ensured, improving the rigidity against the suspension tower's falling down.

A gutter-shaped open cowl structure in which an opening portion which opens upward is formed by a cowl panel which supports a lower end portion of a windshield and a cowl member which is continuous to a front end portion of the cowl panel is known as one embodiment of a cowl structure. This open cowl structure has been recently applied to many vehicles because surroundings of the cowl panel can be used as an air box to guide conditioning air for a vehicle compartment.

The above-described front vehicle-body structure of the vehicle of the patent document can disperse a load which is inputted to the suspension tower from a vehicle wheel to the cowl box, thereby improving the support rigidity of the suspension tower relative to the vehicle body, so that the rigidity against the suspension tower's falling down can be ensured. However, there is a concern that while this front vehicle-body structure can restrain a longitudinal displacement of the top of the suspension tower, a vertical displacement of the top of the suspension tower may not be restrained sufficiently by this front vehicle-body structure as specifically described below.

First, since the upper face of the top of the suspension tower is pressed down by the connecting bracket joined to the upper face of the top plate of the cowl box and the upper wall of the wheel apron in this front vehicle-body structure, only a joint force of the brace to the top plate of the cowl box contributes to restraint of the vertical displacement of the top of the suspension tower, so that the rigidity of both the brace and the cowl member may not be utilized sufficiently for this vertical-displacement restraint. Secondly, since a joint portion to join the connecting bracket to the cowl panel needs to be provided newly in a case in which the open cowl structure is applied, there is a concern that the support rigidity of the joint portion for the cow panel may become insufficient. Thus, it has been required to restrain the vertical displacement of the top of the suspension tower.

SUMMARY OF THE INVENTION

Accordingly, an object of the present invention is to provide a front vehicle-body structure of a vehicle which can properly restrain the vertical displacement of the top of the suspension tower, thereby improving the vehicle-body rigidity.

The present invention is a front vehicle-body structure of a vehicle comprising a cowl panel provided above a dash panel partitioning an engine room from a vehicle compartment and extending in a vehicle width direction, a suspension tower protruding toward an inside of the engine room and supporting a front suspension, and a connecting bracket connecting the suspension tower and the cowl panel and configured to slant rearward and upward, wherein the connecting bracket comprises a front-end flange portion and a rear-end flange portion, the front-end flange portion is joined to a slant portion formed at a rear portion of a top of the suspension tower which is configured to slant rearward and downward, and the rear-end flange portion is configured to rise upward via a bending portion and joined to a vertical wall portion of the cowl panel.

According to the present front vehicle-body structure of the vehicle, since the connecting bracket connects, in a rearward-upward slant shape, between the slant portion of the top of the suspension tower and the vertical wall portion of the cowl panel, the vertical load acting on the top of the suspension tower is supported at the cowl panel as a compressive force for the connecting bracket regardless of the cowl structure, so that the vertical displacement of the top of the suspension tower can be restrained properly.

In an embodiment of the present invention, the cowl panel comprises a body portion which has a roughly S-shaped vertical-cross section of a central portion, in the vehicle width direction, thereof and an end-side portion which has a roughly crank-shaped vertical-cross section of an end-side portion, in the vehicle width direction, thereof which is located on an outward side of the central portion of the cowl panel, the vertical-cross section being a cross section of the cowl panel which is created on a vertical face perpendicular to the vehicle width direction, and the vertical wall portion is formed at the end-side portion.

According to this embodiment, a space for arranging the vertical wall portion where the rear-end flange portion is joined and an auxiliary instrument therein can be provided easily.

In another embodiment of the present invention, the rear-end flange portion of the connecting bracket is joined to the vertical wall portion of the cowl panel at plural joint portions which are arranged next to each other in the vehicle width direction at the same level, and one or more protrusion portions are provided at the rear-end flange portion such that the protrusion portion is located between adjacent joint portions and protrudes upward from the bending portion.

According to this embodiment, the torsional rigidity of the rear-end flange portion about a longitudinal axis can be increased, thereby improving the vehicle-body rigidity further.

In another embodiment of the present invention, the connecting bracket further comprises an end-side flange portion which is joined, by spot welding, to a top wall portion of a wheel apron provided at a side end portion of the engine room and extending in a vehicle longitudinal direction at plural joint portions which are arranged next to each other in the vehicle longitudinal direction.

According to this embodiment, since the connecting bracket is joined, at the plural joint portions, to a face (i.e., the top wall portion of the wheel apron) which is different from the vertical wall portion of the cowl panel in the direction, in addition to the joining to the vertical wall portion of the cowl panel at the plural joint portions, the displacement of the top of the suspension tower can be restrained further.

Other features, aspects, and advantages of the present invention will become apparent from the following description which refers to the accompanying drawings.

DETAILED DESCRIPTION OF THE INVENTION

Figure 1:
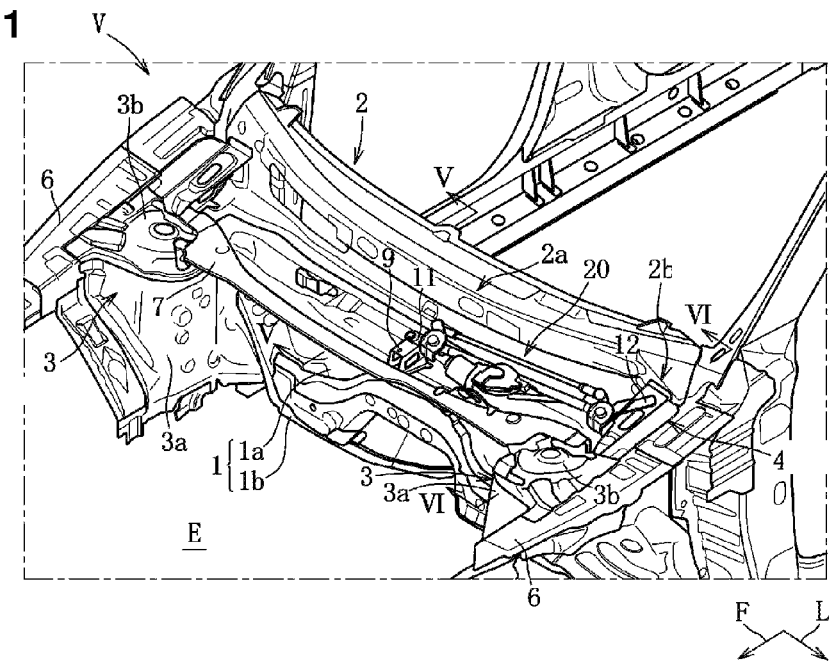
FIG. 1 is a perspective view of a front vehicle body of a vehicle according to an embodiment of the present invention.

Hereafter, an embodiment of the present invention will be described specifically referring to the drawings. The following description exemplifies the present invention which is applied to a vehicle, but the present invention should not be limited to this.

Figure 2:
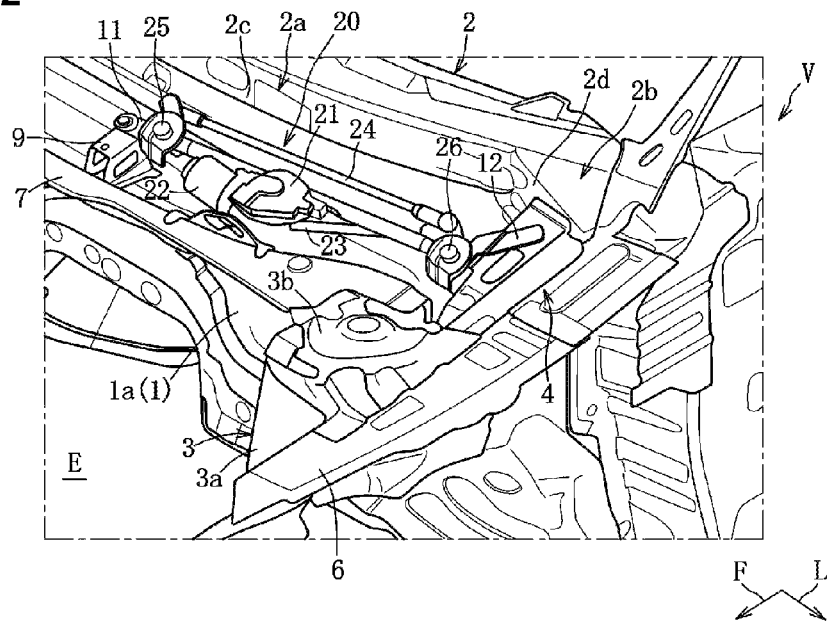
FIG. 2 is a major-part enlarged view of FIG. 1.

Hereafter, the embodiment of the present invention will be described referring to FIGS. 1-6. As shown in FIGS. 1 and 2, a vehicle V comprises a dash panel 1 which partitions an engine room E from a vehicle compartment, a cowl panel 2 which is provided above the dash panel 1 and extends in a vehicle width direction, a pair of right-and-left suspension towers 3 which are provided to protrude toward the inside of the engine room E, and a pair of right-and-left connecting brackets 4 which connect the pair of suspension towers 3 and the cowl panel 2, respectively. Herein, an arrow F shows a forward direction, and an arrow L shows a leftward direction.

The dash panel 1 comprises a vertical wall portion 1a which extends vertically at a front end portion of the vehicle compartment, a slant portion 1b which extends rearward from a lower end edge of the vertical wall portion 1a in a slant shape such that it slants rearward and downward, and a dash cross member 5 which has a closed cross section extending in the vehicle width direction which is formed by the dash cross member 5 and the vertical wall portion 1a. Respective rear end portions of a pair of right-and-left front side frames (not illustrated) are joined to a front face of a lower-end side portion of the vertical wall portion 1a at a pair of right-and-left joint portions.

A pair of right-and-left wheel aprons 6 extending in a vehicle longitudinal direction are provided at right-and-left both end portions of the engine room E to form right-and-left both side walls of the engine room E. The pair of wheel aprons 6 support the pair of right-and-left suspension towers 3, respectively, together with the pair of right-and-left front side frames arranged at a lower level.

Next, the cowl panel 2 will be described. As shown in FIGS. 1, 2, 5 and 6, the cowl panel 2 comprises a cowl member 7 which extends forward from a front end portion of the cowl panel 2 and a cowl front 8. The cowl panel 2, the cowl member 7, and the cowl front 8 form an open cowl structure in which an opening portion opens upward in a side view (when viewed from the side).

The cowl panel 2 comprises a body portion 2a which has a roughly S-shaped vertical-cross section of a central portion, in the vehicle width direction, thereof and a pair of right-and-left end-side portions 2b which have a roughly crank-shaped vertical-cross section of both end-side portions, in the vehicle width direction, thereof which are located on an outward side of the central portion of the cowl panel 2, respectively. Herein, the above-described vertical-cross section is a cross section of the cowl panel 2 which is created on a vertical face perpendicular to the vehicle width direction. A projection portion 2c which projects forward is formed at an upper-half portion of the body portion 2a. This projection portion 2c is configured such that its forward-projection amount decreases gradually toward an outward side in the vehicle width direction, and a pair of vertical wall portions 2d are formed at the above-described pair of end-side portions 2b of the cowl panel 2.

The cowl member 7 forms, together with the cowl panel 2, a concaved gutter shape which extends in the vehicle width direction. This cowl member 7 forms a bottom wall portion and a front wall portion of the gutter shape, and is configured such that a longitudinal width of its central portion in the vehicle width direction is greater than that of its end-side portion in the vehicle width direction. A support portion 9 for a wiper device is provided at the central portion, in the vehicle width direction, of the cowl member 7. The cowl front 8 extends in the vehicle width direction and reinforces a lower-side front end portion of the cowl member 7. This cowl front 8 is configured such that its central portion in the vehicle width direction has a roughly crank-shaped vertical-cross section. Herein, the vertical-cross section is a cross section of the cowl front 8 which is created on a vertical face perpendicular to the vehicle width direction. Further, the cowl front 8 is joined to the pair of right-and-left suspension towers 3 at its both end portions in the vehicle width direction.

Figure 6:
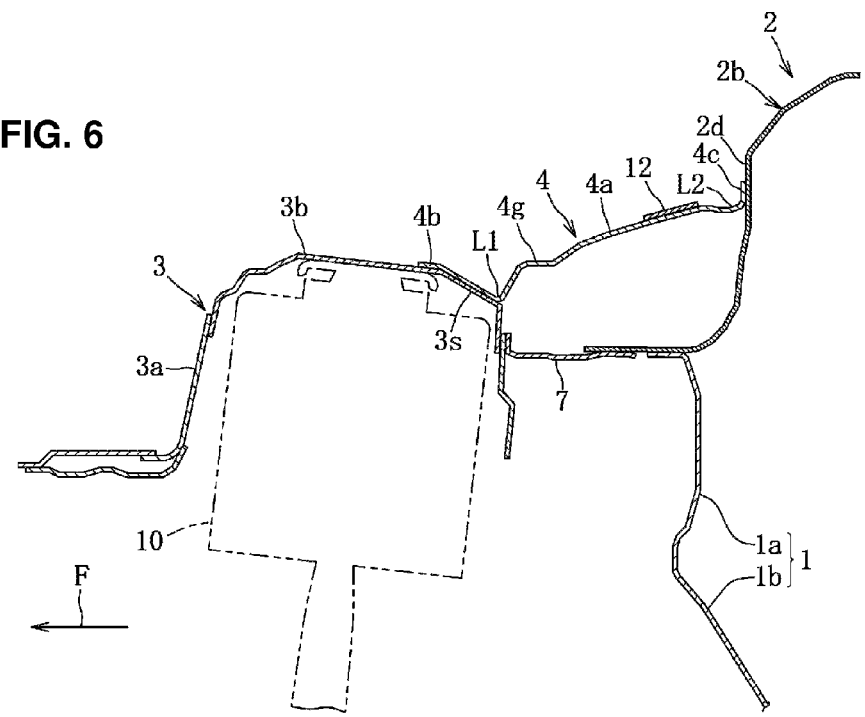
FIG. 6 is a sectional view taken along line VI-VI of FIG. 1.

Next, the pair of right-and-left suspension towers 3 will be described. Herein, since the pair of right-and-left suspension towers 3 are symmetrical, the structure of the left-side suspension tower 3 will be described mainly. As shown in FIGS. 1, 2 and 6, the suspension tower 3 is configured to protrude from the wheel apron 6 toward the inside of the engine room E. The suspension tower 3 comprises a hollow cylindrical portion 3a which has a central axis extending rearward and upward and a cup-shaped top portion 3b which covers an upper end portion of the cylindrical portion 3a.

Upper portions of a damper device 10 (a damper, a spring and others) and the like of a front suspension mechanism (not illustrated) are stored in the suspension tower 3. A spring sheet joined to an upper end portion of the damper device 10 is fixedly fastened to the top 3b via a mount rubber by a fastening member. The top 3b of the suspension tower 3 has a slant portion 3s at its rear portion. As shown in FIG. 6, the slant portion 3s forms a slant face which slants rearward and downward. The slant face 3s is located at the level between the bottom wall portion of the cowl member 7 and the upper end portion of the vertical wall portion 2d.

Figure 4:
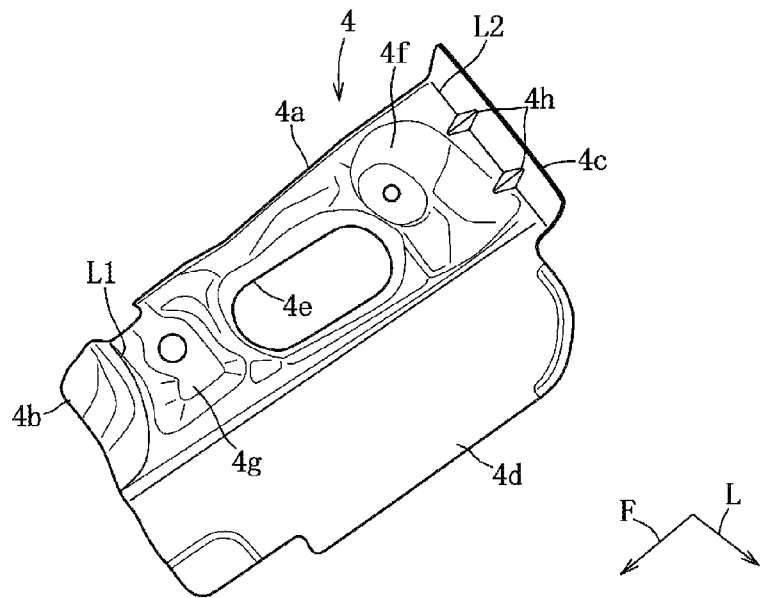
FIG. 4 is a perspective view of the connecting bracket.
Figure 5:
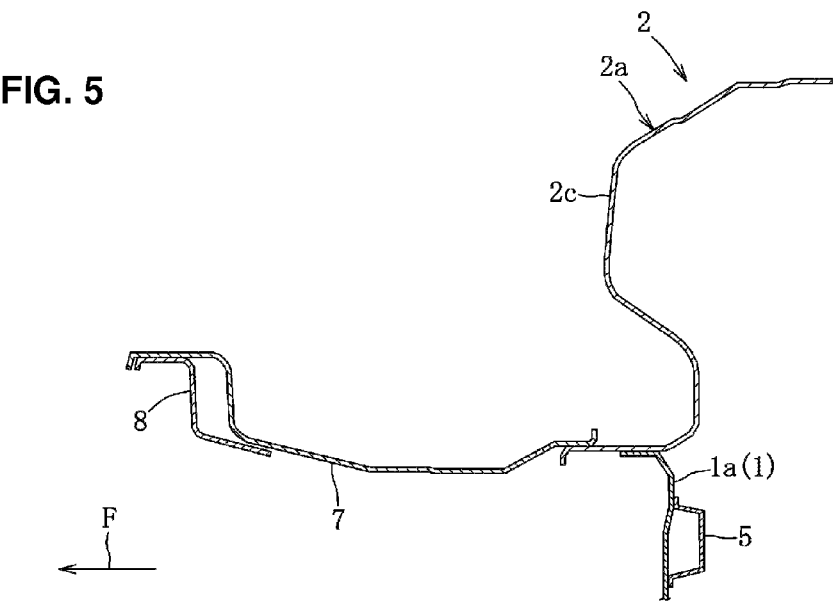
FIG. 5 is a sectional view taken along line V-V of FIG. 1.

Next, the pair of right-and-left connecting brackets 4 will be described. Herein, since the pair of right-and-left connecting brackets 4 are symmetrical, the structure of the left-side connecting bracket 4 will be described mainly. The connecting bracket 4 is made of a metal plate having a longitudinal-long rectangular shape through pressing. As shown in FIG. 4, the connecting bracket 4 comprises a body portion 4a, a front-end flange portion 4b which is configured to rise, slanting forward and upward, via a curve-shaped front-end bending portion L1 of the body portion 4a, a rear-end flange portion 4c which is configured to rise via a straight-shaped rear-end bending portion L2 of the body portion 4a, and an end-side flange portion 4d which is configured to extend outward in the vehicle width direction from the body portion 4a.

The body portion 4a is arranged between the cowl panel 2 and the suspension tower 3 in a slant shape such that it slants rearward and upward. Accordingly, when a vertical load acts on the top 3b of the suspension tower 3, this vertical load is transmitted to the body portion 4a (the connecting bracket 4) as a compressive load. The compressive load transmitted to the body portion 4a is dispersed to the cowl panel 2. That is, the longitudinal displacement of the top 3b of the suspension tower 3 is restrained by the rigidity of the body portion 4a supported at the cowl panel 2 in a state before its buckling.

As shown in FIG. 4, the body portion 4a includes a through hole for working 4e which is formed at its central portion, an attachment portion 4f for fixing of a wiper attaching member 12, and a flat-shaped assembling standard portion 4g which functions as standards of assembling. The attachment portion 4f is formed in a pole shape which protrudes upward in back of the hole for working 4e. The assembling standard portion 4g is formed in front of the hole for working 4e.

Figure 3:
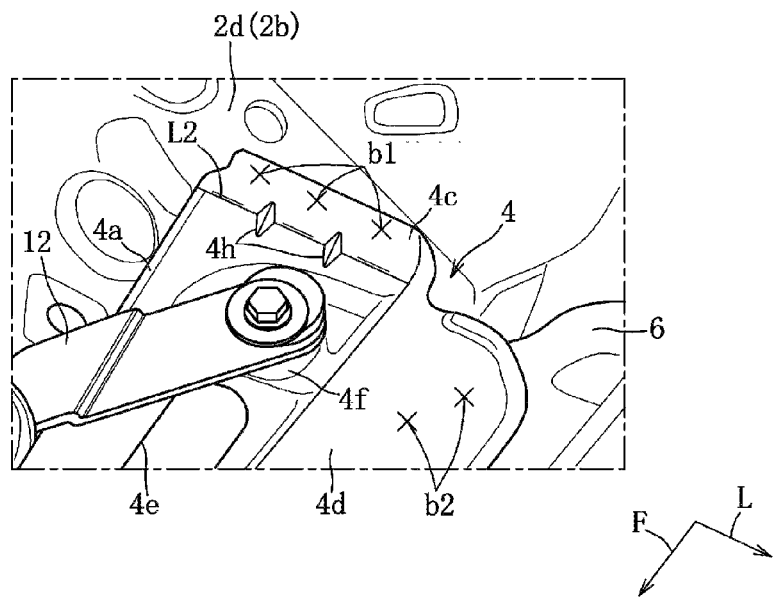
FIG. 3 is a perspective view of surroundings of a rear-end flange portion of a connecting bracket.

As shown in FIG. 6, the front-end flange portion 4b is joined to the slant portion 3s at plural joint portions (not illustrated) by spot welding. The rear-end flange portion 4c is joined, by spot welding, to the vertical wall portion 2d at plural joint portions b1 which are arranged next to each other in the vehicle width direction at the same level. As shown in FIGS. 3 and 4, plural protrusion portions 4h are provided at the rear-end bending portion L2 such that the protrusion portions 4h are located between the adjacent joint portions b1 and protrude upward from the rear-end bending portion L2. Thereby, the torsional rigidity about a longitudinal axis of the rear-end flange portion 4c can be increased.

As shown in FIGS. 1-3, the end-side flange portion 4d is joined, by spot welding, to a top wall portion of the wheel apron 6 at plural (five, for example) joint portions b2 which are arranged next to each other in the vehicle longitudinal direction. Accordingly, the connecting bracket 4 connects the cowl panel 2 and the suspension tower 3 in such a manner that it slants rearward and upward when viewed from the side.

Next, a wiper device 20 will be described. As shown in FIGS. 1 and 2, the wiper device 20 is provided at a left-side portion of the cowl structure which is formed by the cowl panel 2, the cowl member 7, and the cowl front 8. The wiper device 20 comprises a base member 21 which is fixed to the cowl member 7, a drive motor 22 which is attached to the base member 21, a connecting rod 23, one end of which is moved by the drive motor 22 so as to move in a circular locus, and a parallelogram link 24 which is coupled to the other end of the connecting rod 23, and a pair of wiper blade (not illustrated) which are respectively fixed to two pivot shafts 25, 26 provided at the parallelogram link 24.

The inward-side pivot shaft 25 is supported at the support portion 9 which is fixed to the cowl member 7 via a wiper attaching member 11. The outward-side pivot shaft 26 is supported, via a wiper attaching member 12, at the attachment portion 4f which is provided at the connecting bracket 4 at a position near the rear-end flange portion 4c. Thus, the connecting bracket 4 has a support function of the wiper device 20.

Next, the operation and effects of the above-described front vehicle-body structure of the vehicle V will be described. According to the present front vehicle-body structure of the vehicle V, since the connecting bracket 4 connects, in the rearward-upward slant shape, between the slant portion 3s of the top 3b of the suspension tower 3 and the vertical wall portion 2d of the cowl panel 2, the vertical load acting on the top 3b of the suspension tower 3 is supported at the cowl panel 2 as a compressive force for the connecting bracket 4 regardless of the cowl structure, so that the vertical displacement of the top 3b of the suspension tower 3 can be restrained properly.

The cowl panel 2 comprises the body portion 2a which has the roughly S-shaped vertical-cross section of the central portion, in the vehicle width direction, thereof and the end-side portion 2b which has the roughly crank-shaped vertical-cross section of the end-side portion, in the vehicle width direction, thereof which is located on the outward side of the central portion of the cowl panel 2, and the vertical wall portion 2d is formed at the end-side portion 2b.

According to this structure, a space for arranging the vertical wall portion 2d where the rear-end flange portion 4c is joined and the wiper device 20 therein can be formed easily.

Since the rear-end flange portion 4c is joined to the vertical wall portion 2d at the plural joint portions b1 which are arranged next to each other in the vehicle width direction at the same level, and one or more protrusion portions 4h are provided at the rear-end flange portion 4c such that the protrusion portions 4h are located between the adjacent joint portions b1 and protrude upward from the rear-end bending portion L2, the torsional rigidity of the rear-end flange portion 4c about its longitudinal axis can be increased, thereby improving the vehicle-body rigidity further.

Since the end-side flange portion 4d is joined, by spot welding, to the top wall portion of the wheel apron 6 provided at the side end portion of the engine room E and extending in the vehicle longitudinal direction at the plural joint portions b2 which are arranged next to each other in the vehicle longitudinal direction, the connecting bracket 4 is joined, at the plural joint portions, to a face (the top wall portion of the wheel apron) which is different from the vertical wall portion 2d in the direction, in addition to the joining to the vertical wall portion 2d at the plural joint portions, the displacement of the top 3b of the suspension tower 3 can be restrained further.

Next, modifications of the above-described embodiment will be described.

1) While the above-described embodiment describes the example in which the present invention is applied to the open cowl structure having the opening portion which opens upward in the side view, the present invention is applicable to a closed-type cowl structure having a closed cross section. In this case, since the connecting bracket is joined to the vertical wall portion of the cowl panel, an opening portion is formed at the cowl member.

2) While the above-described embodiment describes the example in which the rear-end flange portion is joined at three points and two protrusion portions are provided, a single protrusion portion may be provided only at one of two pairs of adjacent joint portions as long as the projection portion is located between the adjacent portions. Further, in a case in which four joint portions are provided, three protrusion portions may be provided and also more than three protrusion portions may be provided so as to correspond to the number of the joint portions.

3) While the above-described embodiment describes the example in which the connecting bracket is joined to the top of the suspension tower, the vertical wall portion of the cowl panel, and the top wall portion of the wheel apron, the end-side flange portion may be omitted as long as at least the connecting bracket is joined to the top of the suspension tower and the vertical wall of the cowl panel. This can also provide the same effects as the above-described embodiment.

4) While the above-described embodiment describes the example in which the wiper device is provided at the left-side portion of the cowl structure, the wiper device may be provided at a right-side portion of the cowl structure. Further, any auxiliary instrument other than the wiper device may be arranged by using the cowl structure.

5) The present invention should not be limited to the above-described embodiment, and any other modifications or improvements may be applied within the scope of a spirit of the present invention.

What is claimed is:

1. A front vehicle-body structure of a vehicle, comprising:
    a cowl panel provided above a dash panel partitioning an engine room from a vehicle compartment and extending in a vehicle width direction;
    a suspension tower protruding toward an inside of the engine room and supporting a front suspension; and
    a connecting bracket connecting the suspension tower and the cowl panel and configured to slant rearward and upward,
    wherein said connecting bracket comprises a front-end flange portion and a rear-end flange portion, said front-end flange portion is joined to a slant portion formed at a rear portion of a top of said suspension tower which is configured to slant rearward and downward, and said rear-end flange portion is configured to rise upward via a bending portion and joined to a vertical wall portion of the cowl panel.

2. The front vehicle-body structure of a vehicle of claim 1, wherein said cowl panel comprises a body portion which has a roughly S-shaped vertical-cross section of a central portion, in the vehicle width direction, thereof and an end-side portion which has a roughly crank-shaped vertical-cross section of an end-side portion, in the vehicle width direction, thereof which is located on an outward side of the central portion of the cowl panel, said vertical-cross section being a cross section of the cowl panel which is created on a vertical face perpendicular to the vehicle width direction, and said vertical wall portion is formed at said end-side portion.

3. The front vehicle-body structure of a vehicle of claim 2, wherein the rear-end flange portion of said connecting bracket is joined to the vertical wall portion of said cowl panel at plural joint portions which are arranged next to each other in the vehicle width direction at the same level, and one or more protrusion portions are provided at the rear-end flange portion such that the protrusion portion is located between adjacent joint portions and protrudes upward from said bending portion.

4. The front vehicle-body structure of a vehicle of claim 3, wherein said connecting bracket further comprises an end-side flange portion which is joined, by spot welding, to a top wall portion of a wheel apron provided at a side end portion of the engine room and extending in a vehicle longitudinal direction at plural joint portions which are arranged next to each other in the vehicle longitudinal direction.

5. The front vehicle-body structure of a vehicle of claim 1, wherein the rear-end flange portion of said connecting bracket is joined to the vertical wall portion of said cowl panel at plural joint portions which are arranged next to each other in the vehicle width direction at the same level, and one or more protrusion portions are provided at the rear-end flange portion such that the protrusion portion is located between adjacent joint portions and protrudes upward from said bending portion.

6. The front vehicle-body structure of a vehicle of claim 5, wherein said connecting bracket further comprises an end-side flange portion which is joined, by spot welding, to a top wall portion of a wheel apron provided at a side end portion of the engine room and extending in a vehicle longitudinal direction at plural joint portions which are arranged next to each other in the vehicle longitudinal direction.

* * * * *